United States Patent [19]

Maxon

[11] 3,909,709
[45] Sept. 30, 1975

[54] CONDUCTIVITY MEASURING APPARATUS

[76] Inventor: Leroy J. Maxon, 1615 N. 29th Ave., Hollywood, Fla. 33020

[22] Filed: Apr. 4, 1974

[21] Appl. No.: 458,058

[52] U.S. Cl. ............................ 324/30; 324/65 R
[51] Int. Cl.² ..................................... G01N 27/42
[58] Field of Search ............. 324/30 R, 30 B, 65 R; 204/242

[56] References Cited
UNITED STATES PATENTS

| | | | |
|---|---|---|---|
| 2,995,703 | 8/1961 | Rogers | 324/65 R |
| 3,196,682 | 7/1965 | Johnson, Jr. | 324/65 R |
| 3,696,360 | 10/1972 | Gajewski | 324/65 R |
| 3,714,560 | 1/1973 | Farr | 324/65 R |
| 3,766,471 | 10/1973 | Pullman | 324/65 R |

*Primary Examiner*—Alfred E. Smith
*Assistant Examiner*—Michael J. Tokar
*Attorney, Agent, or Firm*—Silverman & Cass, Ltd.

[57] ABSTRACT

An apparatus for measuring the conductivity of an element includes an oscillator which develops an a.c. signal. The oscillator circuit includes the primary winding of a transformer. The secondary winding of the transformer is a.c. coupled to a sensor. The sensor is constructed to be placed in contact with the element whose conductivity is to be measured. The element whose conductivity is to be measured is also placed in contact with a reference potential. This reference potential is also applied to portions of the apparatus. The element completes a conductive a.c. path between the sensor and the reference potential. The a.c. path conductivity is equal to the conductivity of the element. The transformer secondary winding has an a.c. signal induced thereacross from the transformer primary which varies in accordance with the conductivity of the path provided by the sensor and element. A meter coupled to the transformer operates in response to the amplitude of the induced a.c. signal to indicate the conductivity of the element.

12 Claims, 1 Drawing Figure

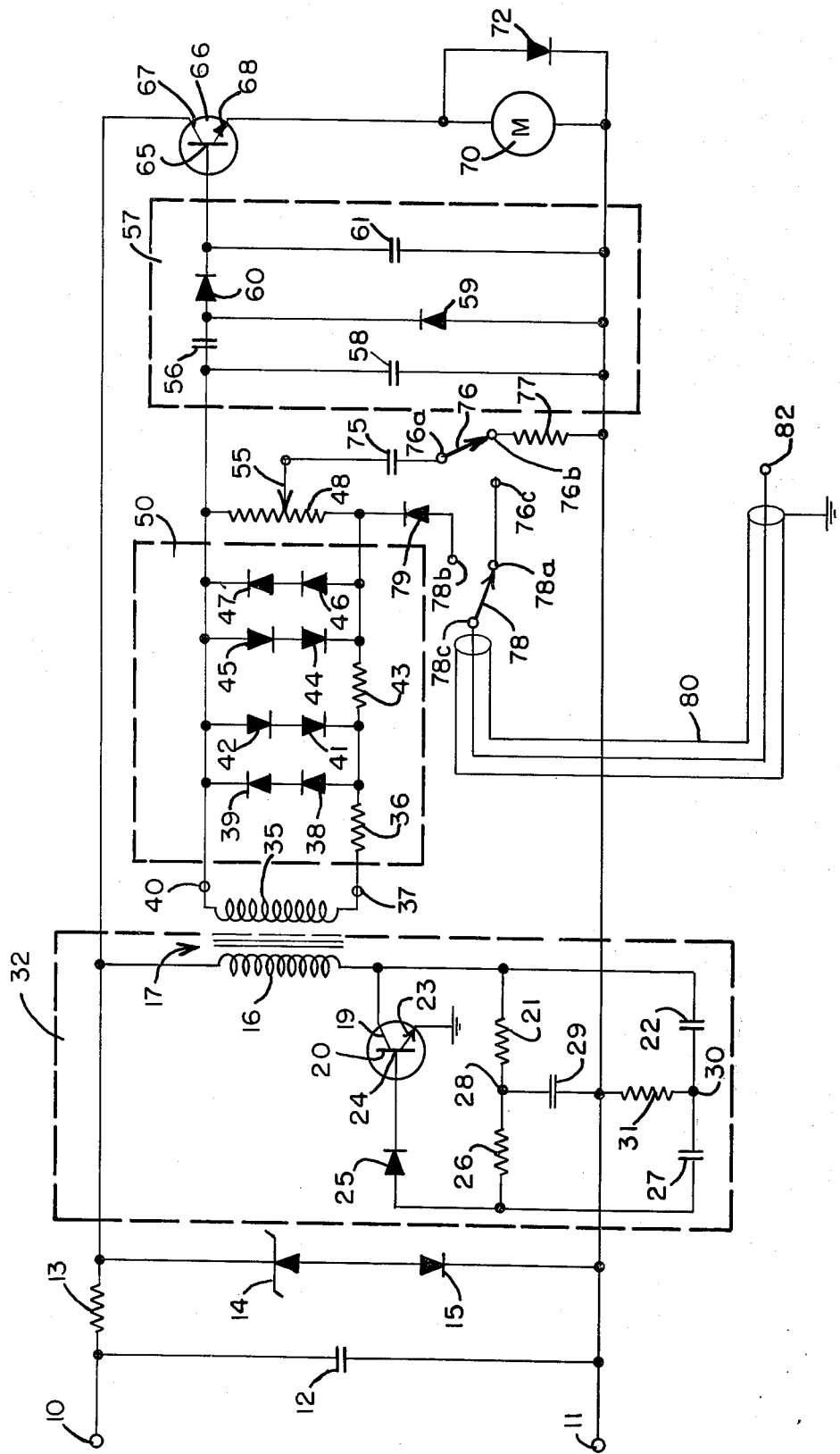

CONDUCTIVITY MEASURING APPARATUS

BACKGROUND OF THE INVENTION

This application relates to apparatus for measuring conductivity of an element and more particularly to an apparatus for measuring the water and mineral content in a fuel tank and/or measuring the salinity content of an engine cooling system.

It is known today that condensation resulting from the hydrometric state of the air, or to some other cause, can cause the formation of a certain amount of undissolved water is suspension in a hydrocarbon compound such as gasoline. This can become a serious problem in the fuel tank of an internal combustion engine, or in certain portions of the fuel systems of cars, boats and airplanes. The water, in either a liquid vapor or solid form, can cause damage to an internal combustion engine and can even cause an operation stoppage which, in the case of an airplane, can have catastrophic results. The problem is further compounded by the presence of certain minerals within the water, such as for example salt, which can cause rusting and deterioration in addition to damaging the portions of an internal combustion engine. Salt in water can also cause serious damage in the cooling system of internal combustion engines.

Devices are available which can detect the quantity of water in a liquid fuel of the presence of ice in a fuel system. Such devices operate on the principle of a difference in conductivity between the water or ice and the fuel. In devices heretofore provided, direct current signals were coupled to the fuel. The magnitude of these signals was great enough to cause ignition of the fuel rendering the devices dangerous for use in most applications. Although a.c. signals have also been coupled to the fuel, the level of these a.c. signals was also great enough to cause a potentially dangerous situation.

If the sensor employed in the device is left continuously in contact with the element to be tested, electrolysis of the sensor can occur. This electrolysis will affect the device measuring accuracy requiring recalibration before every measurement.

It is also desirable to have a relatively simple portable device which can measure variations in conductivity of known elements. For example, pure water has one conductivity. Salt water has a second conductivity, and water, polluted with other minerals, will have a conductivity different from either the pure water or the salt water. It would be a great advantage to environmentalists to have a small portable device capable of measuring variations in conductivity of an element such as water in order to determine whether the water is pure or polluted.

SUMMARY OF THE INVENTION

In practicing this invention, an electrical apparatus is provided for measuring variation in conductivity of an element normally having a first conductivity when the variation is due to the presence, type and amount of a material having a second conductivity in the element. The apparatus includes an oscillator operative in response to an applied signal to generate an a.c. signal. A coupling device is coupled to the oscillator and develops a first signal in response to the a.c. signal developed by the oscillator. A sensor is a.c. coupled to the coupling device. A commercially manufactured sensor may be used, or the sensor maybe especially constructed and arranged to be placed in contact with the element to be measured. The element to be measured is placed in contact with a reference potential which is also common to the apparatus. Placing the element in contact with the sensor completes a conductive a.c. path between the sensor and the reference potential. The path conductivity varies in accordance with, and is determined by the conductivity of the element and the conductivity of the material in the element. The coupling device is responsive to variations in the path conductivity through the element to vary the amplitude of the reference potential. An indicator device is coupled to the sensor through a rectifier and current amplifier and is operative in response to the amplitude of the first signal to indicate the variation in conductivity of the element from the first or normal conductivity.

The sensor, when placed in contact with the element, may be subject to electrolysis. When conductivity tests are being made, the a.c. signals are coupled to the sensor, preventing electrolysis. However, it is not desirable to couple a.c. signals to the sensor continuously. To prevent electrolysis a diode is provided which selectively couples the probe to the coupling device when conductivity tests are not being performed. The diode provides a d.c. potential to the sensor which prevents electrolysis. The d.c. potential is so low that there is no possible danger of explosion of fire.

BRIEF DESCRIPTION OF THE DRAWINGS

The single FIGURE is a schematic diagram of the conductivity measuring apparatus of this invention.

DETAILED DESCRIPTION OF THE PREFERRED EMBODIMENT

Referring to the drawing, terminals 10 and 11 are input terminals of the apparatus which are to be connected to a source of potential such as a battery or other power supply. Terminal 10 is the positive terminal and terminal 11 the negative terminal. Terminal 11, in addition to being the negative terminal, will also be the a.c. apparatus ground and is connected to the container in which the element being measured is placed in order to provide a common a.c., and preferably d.c. ground. If the conductivity measuring apparatus is used for example in a boat, terminal 11, in addition to being the negative terminal, will also be the chassis ground so that the fuel tank of the boat and engine cooling system will be connected to terminal 11 through the chassis and power supply connections of the boat.

A filter capacitor 12 is coupled between terminals 10 and 11. Resistor 13 has one end thereof coupled to input terminal 10 and the other end therof coupled to the cathode of zener diode 14. The anode of zener diode 14 is coupled to the anode of temperature compensating diode 15. The cathode of diode 15 is coupled to input terminal 11. Resistor 13, zener diode 14 and diode 15 act to maintain a constant voltage for the apparatus even though the source of potential coupled to terminals 10 and 11 varies substantially. This prevents the occurrence of errors in conductivity measurement due to changes in supply potential.

The junction of resistor 13 and zener diode 14 is coupled to one terminal of primary winding 16 in transformer 17. The second terminal of primary winding 16 is coupled to collector 19 of transistor 20, to one end of resistor 21 and one end of capacitor 22. Emitter electrode 23 of transistor 20 is coupled to ground potential, and base electrode 24 is coupled to the cathode of diode 25. The anode of diode 25 is coupled to one terminal of resistor 26 and one terminal of capacitor 27. The second terminal of resistor 26 is coupled to junction 28, which is also coupled to the second terminal of resistor 21 and to one terminal of capacitor 29. The second terminal of capacitor 27 is coupled to junction 30 which is also coupled to the second terminal of capacitor 22 and one terminal of resistor 31. The second terminal of capacitor 29, and the second terminal of resistor 31 are coupled together and to input terminal 11. Transistor 20, resistors 21, 26 and 31, capacitors 22, 27 and 29 and diode 25 form oscillator 32 which, in the preferred embodiment operates at a frequency of 1200 Hz. Transformer 17 is employed to DC isolate the oscillator from the squarer and following circuits.

Transformer 17 also includes a secondary winding 35. One terminal of resistor 36 is coupled to low side terminal 37 of transformer secondary 35. The series combination of diodes 38 and 39 is coupled from the other terminal of resistor 36 to high side terminal 40 of secondary winding 35. The series combination of diodes 41 and 42 is connected in parallel with diodes 38 and 39. Diodes 41 and 42 are arranged to conduct in a direction opposite to the direction of conduction of diodes 38 and 39.

One terminal of resistor 43 is connected to the junction of resistor 36 and diodes 38 and 41. The series combination of diodes 44 and 45 is coupled from the other terminal of resistor 43 to high side terminal 40 of secondary winding 35. The series combination of diodes 46 and 47 is connected in parallel with diodes 44 and 45. Diodes 46 and 47 are arranged to conduct in a direction opposite to the direction of conduction of diodes 44 and 45. A potentiometer 48 is coupled from the junction of resistor 43 and diodes 44 and 46 to terminal 40 of secondary winding 35.

Resistors 36 and 43 and diodes 38, 39, 41, 42, 44, 45, 46 and 47 form a limiter 50. Limiter 50 acts to limit the a.c. signal induced across secondary winding 35 from oscillator 32 to a maximum of 1.4 volts peak to peak. Limiter 50 also squares the induced a.c. signal, thus providing a square wave signal at terminal 51 and across potentiometer 48. The square wave signal eliminates any potential inaccuracies in the appartus due to waveform variations. Furthermore, the construction and arrangement of limiter 50 prevents potentiometer 48 from loading secondary 35 when control arm 55 is moved to any position. This prevents variations in the output of oscillator 32 due to variations in the oscillator circuit impedance, caused by impedance variations reflected across primary winding 16 from secondary winding 35.

Terminal 40, the high side of transformer secondary 35 is coupled to one terminal of capacitor 56 in voltage doubler 57, and one terminal of a.c. bypass capacitor 58. The other terminal of a.c. bypass capacitor 58 is coupled to terminal 11, and the other side of capacitor 56 is coupled to the cathode of diode 59 and the anode of diode 60. The anode of diode 59 is coupled to terminal 11, and the cathode of diode 60 is coupled to one terminal of capacitor 61 in voltage doubler 57. The other terminal of capacitor 61 is coupled to terminal 11. The junction of capacitor 61 and diode 60 is coupled to base electrode 65 of transistor 66. Collector 67 of transistor 66 is coupled to the junction of resistor 13 and zener diode 14, and emitter 68 of transistor 74 is coupled to one terminal of an ammeter 70. The second terminal of ammeter 70 is coupled to terminal 11. A diode 72 is coupled in parallel with ammeter 70.

The arm 55 of potentiometer 48 is coupled to one terminal of a.c. coupling capacitor 75. The second terminal of a.c. coupling capacitor 75 is coupled to terminal 76a of switch 76. A resistor 77 is coupled from terminal 76b of switch 76 to terminal 11, and terminal 76c is coupled to terminal 78a of switch 78. The anode of diode 79 is coupled to switch terminal 78b and the cathode is coupled to the junction of resistor 43 and diodes 44 and 46. Terminal 78c of switch 78 is connected to the center conductor of a shielded cable 80. The center conductor of cable 80 is connected at its far end to sensor 82. The shield of cable 80 is connected to the casing portion of sensor 82. As the casing of sensor 82 will be placed in contact with a fuel tank or engine block, the casing of sensor 82, and therefore the shield of cable 80 will be at a.c. ground potential. The remote end of the cable 80 therefore is shown at a.c. ground in the FIGURE. In the preferred embodiment, sensor 82 is manufactured from a non-corrosive material such as stainless steel so that it can withstand contact with corrosive elements such as salt water and even certain hydrocarbons which are used as fuel. The stainless steel will also be less affected by any electrolysis actions produced when the sensor 82 is in contact with the element being tested.

In operation, sensor 82 is placed in contact with the element whose conductivity is to be measured, contacts 76a and 76b of switch 76 are connected and contacts 78a and 78c of switch 78 are connected. If, for example, the water content of fuel in a boat is to be measured, sensor 82 is placed in contact with the fuel in the fuel tank. The fuel tank itself is at a.c. ground potential. Assuming the fuel is gasoline, gasoline normally have a very low conductivity. If there is water in the gasoline, the water, whose conductivity is greater than gasoline, will cause an increase in the conductivity of the gasoline within the tank. The gas in the tank, when placed in contact with sensor 82 will complete a path from sensor 82 to the tank which is ground potential. The conductivity of this path, or the impedance of this path will vary in accordance with the amount of water in the gasoline. That is, the greater the water content of the gasoline the greater the conductivity. Should the water include salt, the conductivity will be greater as salt is a mineral whose conductivity is greater than pure water. The conductivity of the path through the gas and therefore the resistance of the path provides a coupling path to a.c. ground for a.c. coupling capacitor 75. This a.c. ground is coupled to low side terminal 37 of secondary winding 35 through potentiometer 48 and resistors 43 and 36. The a.c. ground path allows the a.c. signal to the induced across secondary 35. The a.c. signal developed across secondary winding 35 will be coupled from high side terminal 40, will be limited via limiter 50 and will be doubled via voltage doubler 57. The doubled a.c. signal will be coupled to base 65 of transistor 66 causing transistor 66 to conduct. When transistor 66 conducts, current will flow through ammeter 70 which will produce an output reading indicating the fuel conductivity or water content.

The greater the conductivity of the element being measured, or the lower its resistivity, the closer low side terminal 37 of secondary 35 will be coupled to a.c.

ground potential. As the impedance in the a.c. ground path decreases, the a.c. signal induced across secondary 35 will increase. With an increased a.c. signal induced across secondary 35, a high amplitude signal will be induced across secondary 35, doubled by voltage doubler 57 and coupled to base 65 of transistor 66. This will cause transistor 66 to increase its conductivity supplying more current to ammeter 70 which in turn will indicate a higher current reading, thus indicating a higher water content.

An increase in conductivity then through the element being sensed will cause an increase in meter reading at the ammeter 70. Conversely, a decrese in conductivity of the element into which sensor 82 is placed and which is to be sensed, will cause a decrease in conductivity of transistor 66 and a resultant decrease in the meter reading at ammeter 70.

It should be noted that the only signal being coupled through sensor 82 and through the element being sensed, is an a.c. signal. The a.c. signal is very low in amplitude and current so there is little chance of igniting the fuel in the tank. In the preferred embodiment, transistor 66 requires only approximately six microamperes at base electrode 65 in order to render the transistor fully conductive. The current which must pass through sensor 82 and the conductive path provided by the element need therefore only be as great as the required base current. As this only six microamperes, the current through the element, which in the emodiment described is fuel, will be limited to approximately six microamperes. This small amount of current is far less than than necessary to create a spark which could cause ignition of the fuel in the tank.

Furthermore, coupling an a.c. signal only to sensor 82 prevents electrolysis from occurring in the fuel and at sensor 82. With the possibility of electrolysis eliminated there will be no accumulation on the sensor 82 which can cause a change in its impedance and therefore a change in the a.c. conductive path. As there is no electrolysis and no path impedance change from electrolysis the apparatus will not have to be recalibrated before every use and will remain extremely accurate, even after long periods of use without calibration.

In using the apparatus shown in the drawing, it is advisable to provide some means for calibrating the apparatus so as to reference the reading of meter 70 against some established reference. In the embodiment shown in the drawing, switch 76 provides such a means. Switch 76, when contacts 76a and 76b are connected provides a fixed resistance path between one terminal of capacitor 75 and a.c. ground potential at terminal 11. This resistance path in the preferred embodiment has a resistance less than the resistivity of pure water. With switch 76 thus connected, low side terminal 37 of secondary winding 35 is coupled as directly to ground potential as it potentially possible. A maximum a.c. signal therefore is induced across secondary winding 35. With such a maximum a.c. signal induced across secondary 35, moveable arm 55 of potentiometer 48 can be adjusted in order to provide as much or as little impedance to ground as is necessary in order to provide the desired deflection at meter 70.

In most applications, it is undesirable to continuously test for moisture content. If, however, the a.c. signal is terminated, electrolysis can begin which would cause deposition of material onto sensor 82, thus changing its resistance and producing a measurement error. To prevent such an occurrence spring biased switch 78 is provided. Switch 78, when unactuated is biased such that terminals 78b and 78c are connected. This connects diode 79 to sensor 82. Diode 79 provides a d.c. path to low side terminal 37. The very low negative d.c. voltage induced at terminal 37 is coupled via diode 79 to sensor 82. This negative signal prevents electrolysis from occurring.

It should be understood that although the above noted device is described in conjunction with use in a gasoline engine and particularly the fuel tank of such an engine, it may have a great many other uses and applications. For example, because the entire apparatus is transistorized, it requires very low voltage and current applied at the terminals 10 and 11. The apparatus can be contained in a portable device which can have a small container attached thereto and connected to a.c. ground potential at terminal 11. The entire apparatus would then be carried to a site such as a manufacturing facility. The conductivity of pure water could be first calibrated at 0 or 50 percent of full scale so that a comparison reading could be obtained at ammeter 70. Water, used in the manufacturing process, and discharged as waste could be sampled. If the mineral content of discharged water was high, its conductivity would be greater than the conductivity of pure water and would produce a higher reading at ammeter 70. This comparison reading could be used in order to determine whether the mineral content of the discharged water would be so great as to constitute a threat to the environment. Such device, of course, would save a great deal of time in making such determinations, and could be used for requiring a manufacturing facility to make immediate changes to its water waste processing or treatment.

While the invention has been illustrated and discussed with respect to one particular embodiment and a few usages, these are merely intended as examples, it being understood that other modifications to the apparatus and usages for same will be apparent to those skilled in the art.

What it is desired to secure by Letters Patent of the United States is:

1. An electrical apparatus for measuring variations in conductivity of an element having a first conductivity wherein said variation is due to the presence, type and amount of a material in said element having a second conductivity, said element being contained in an electrically conductive container, said apparatus comprising:

a shielded cable, the electrical shielding thereof adapted to electrically connect said electrical apparatus ground to said container, an oscillator for generating an AC signal;

coupling means coupled to said oscillator for developing a reference potential in response to said AC signal, said coupling means including a voltage limiting network comprised of a plurality of parellel rectifier circuits each comprised of a plurality of rectifiers and adapted to provide failsafe voltage limiting of said reference potential to 1.4 volts peak to peak;

sensor means electrically connected to said reference potential via said shielded cable, said sensor means being constructed and arranged to be placed in contact with said element, said element completing a conductive path between said container and said reference potential via said sensor means, said path conductivity varying in accordance with said variations in conductivity of said element;

means responsive to said variations in conductivity for creating an amplitude varying signal; indicator means responsive to said amplitude varying signal and adapted to indicate said variations in conductivity of said element;

test means including a resistance and means for selectively disconnecting said sensor means from said reference potential and connecting said resistance to said reference potential whereby a predetermined potential is applied to said means for creating said amplitude varying signal; and variable resistance means for adjusting said predetermined potential.

2. An electrical apparatus for measuring variation in conductivity of an element having a first conductivity wherein said variation is due to the presence, type and amount of material having a second conductivity in said element, said apparatus comprising:

a first and second terminal for connection to a source of potential having a first reference potential and a second source of potential, said first reference potential being in contact with said element;

oscillator means coupled to said first and second terminals and operative in response to said source of potential to develop an AC signal;

a transformer having a primary and secondary winding, said primary winding coupled with said oscillator means and having a portion of said AC signal developed there across, said secondary winding having third and fourth terminals;

sensor means AC coupled to said secondary windings, said sensor means constructed and arranged to be placed in contact with said element, said element completing a conductive AC path between said sensor means and said first reference potential, the AC path conductivity varying in accordance with said variation in conductivity of said element, said transformer secondary inducing a first AC signal there across having an amplitude which varies in accordance with said variation in said AC path conductivity;

means for limiting the peak to peak excursions of said first AC signal to a value below that required for sparking in an explosive atmosphere, said value being 100 milliamps; and indicator means in circuit with said transformer secondary and operative in response to said first AC signal to indicate the variation in conductivity of said element.

3. The apparatus of claim 1 wherein said coupling means includes an input for receiving said a.c. signal, said coupling means having an output terminal, a reference terminal and impedance means therebetween, said coupling means developing said first signal at an output terminal, said sensor means being a.c. coupled only to said impedance means.

4. The apparatus of claim 3 wherein said oscillator means includes, a transformer primary winding and said coupling means includes a secondary winding of said transformer, said secondary winding having a first and second terminal for developing a first a.c. signal thereacross in response to said oscillator a.c. signal, said transformer secondary winding first terminal being coupled to said coupling means reference terminal, said a.c. signal varying in amplitude in accordance with said variation in said path conductivity.

5. The apparatus of claim 4 wherein said coupling means further includes, amplifier means coupled to said transformer secondary winding second terminal and to said output terminal and operative in response to said first a.c. signal to develop said first signal, said first signal being a first current which varies in amplitude in accordance with said variation in conductivity of said element, said indicator means including a current meter coupled to said output terminal and operative in response to said first current to indicate said variations in said element conductivity.

6. The apparatus of claim 4 wherein said coupling means further includes, limiter means coupled to said transformer first and second terminals for limiting said first a.c. signals to a maximum amplitude, voltage doubler means coupled to said second terminal for doubling said first a.c. signal, amplifier means coupled to said voltage doubler means and said output terminal and operative in response to said doubled first a.c. signal to develop said first signal and couple same to said output terminal, said first signal being a first current which varies in amplitude in accordance with said variations in conductivity, said indicator means including a current meter coupled to said output terminal and operative in response to said first current to indicate said variations in said element conductivity.

7. The apparatus of claim 6 wherein said amplifier means includes, a transistor having base, emitter and collector electrodes, said base electrode being coupled to said voltage doubler means, said emitter electrode being coupled to said current meter, said collector electrode being coupled to a source of potential, said amplifier means being rendered conductive and conducting current from said collector to emitter electrodes in accordance with the amplitude of said signal coupled to said base electrode.

8. The apparatus of claim 1 wherein said variations in conductivity in said element and said variations in said path conductivity are variations in impedance, said coupling means being operative in response to said variations in impedance to vary the amplitude of said first signal, said indicator means operative in response to said variations in amplitude of said first signal to indicate said variations in conductivity of said element.

9. The apparatus of claim 8 further including electrolysis means selectively coupling said coupling means to said sensor means for inhibiting electrolysis of said sensor means in contact with said element.

10. The apparatus of claim 9 wherein said electrolysis means includes diode means coupled to said coupling means and selectively coupled to said sensor means.

11. The apparatus of claim 9 wherein a coupling capacitor a.c. couples said sensor means to said coupling means and further including switching means for selectively coupling one of said coupling capacitor and said electrolysis means to said sensor means whereby said a.c. signal through said coupling capacitor and said d.c. signal through said diode inhibit electrolysis.

12. The apparatus of claim 2 further including,
signal limiting means coupled between said secondary winding third and fourth terminals for limiting said first a.c. signal amplitude,
voltage doubler means coupled to said transformer secondary winding fourth terminal and operative to develop an amplitude doubled first a.c. signal in response to said first a.c. signal,
amplifier means coupled to said voltage doubler means and operative in response to said amplitude doubled first a.c. signal to develop a first signal varying in accordance with said amplitude doubled first a.c. signal, said indicator means being coupled to said amplifier means and operative in response to said first signal to indicate said variation in conductivity of said element.

* * * * *

UNITED STATES PATENT AND TRADEMARK OFFICE
CERTIFICATE OF CORRECTION

PATENT NO. : 3,909,709
DATED : September 30, 1975
INVENTOR(S) : LEROY J. MAXON

It is certified that error appears in the above-identified patent and that said Letters Patent are hereby corrected as shown below:

Column 1, line 12, change "is" to --in--;
Column 1, line 67, change "maybe" to --may be--;
Column 2, lines 20-27, delete the balance of the paragraph starting with word "However" and ending with "fire." and substitute the following: --The maximum open circuit A.C. potential can not exceed 0.72 volts. The maximum short circuit current can not exceed 30 microamperes total power applied to element(s) can not exceed 21 microwatts. However, it may not be desirable to couple A.C. signals to the sensor continuously. To prevent electrolysis a diode is provided which selectively couples the sensor to the coupling device when conductivity tests are not being performed. The diode provides a D.C. potential to the sensor which prevents electrolysis. The maximum D.C. potential can not exceed 0.72 volts, as it is supplied to the sensor, thru a silicon diode from the 0.72 volts x 30 microampere limiter. The A.C. or D.C. potentials are both so low that there is no possible danger of explosion or fire.--
Column 2, line 52, change "therof" to --thereof--;
Column 4, line 37, change "have" to --has--;
Column 4, line 56, change "the" to --be--;
Column 5, line 29, change "emodiment" to --embodiment--.

Signed and Sealed this third Day of February 1976

[SEAL]

Attest:

RUTH C. MASON
Attesting Officer

C. MARSHALL DANN
Commissioner of Patents and Trademarks